(12) United States Patent
Ohira et al.

(10) Patent No.: US 11,193,895 B2
(45) Date of Patent: Dec. 7, 2021

(54) SEMICONDUCTOR SUBSTRATE FOR EVALUATION AND METHOD USING SAME TO EVALUATE DEFECT DETECTION SENSITIVITY OF INSPECTION DEVICE

(71) Applicant: Hitachi High-Tech Corporation, Tokyo (JP)

(72) Inventors: Kentaro Ohira, Tokyo (JP); Masaki Hasegawa, Tokyo (JP); Tomohiko Ogata, Tokyo (JP); Katsunori Onuki, Tokyo (JP); Noriyuki Kaneoka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 16/758,456

(22) PCT Filed: Oct. 30, 2017

(86) PCT No.: PCT/JP2017/039060
§ 371 (c)(1),
(2) Date: Apr. 23, 2020

(87) PCT Pub. No.: WO2019/087229
PCT Pub. Date: May 9, 2019

(65) Prior Publication Data
US 2020/0340930 A1   Oct. 29, 2020

(51) Int. Cl.
*G01N 21/95* (2006.01)
*G06T 7/00* (2017.01)

(52) U.S. Cl.
CPC ....... *G01N 21/9501* (2013.01); *G06T 7/0004* (2013.01); *G06T 2207/30148* (2013.01)

(58) Field of Classification Search
CPC ............. G01N 21/9501; G01N 23/225; G01N 23/2251; G01N 23/2255; G01N 2223/418;
(Continued)

(56) References Cited

U.S. PATENT DOCUMENTS

| 5,001,344 A | 3/1991 | Kato et al. |
| 2012/0235036 A1 | 9/2012 | Hatakeyama et al. |

(Continued)

FOREIGN PATENT DOCUMENTS

| JP | 59-98532 A | 6/1984 | |
| JP | 59098532 A | * 6/1984 | ............. H01L 21/66 |

(Continued)

OTHER PUBLICATIONS

International Search Report (PCT/ISA/210) issued in PCT Application No. PCT/JP2017/039060 dated Jan. 16, 2018 with English translation (four (4) pages).

(Continued)

*Primary Examiner* — Jamil Ahmed
(74) *Attorney, Agent, or Firm* — Crowell & Moring LLP (57) ABSTRACT

It is necessary to guarantee performance by quantitatively evaluating the defect detection sensitivity of an inspection device for using the mirror electron image to detect defect in a semiconductor substrate. The size and position of accidentally formed defects are random, however, and this type of quantitative evaluation has been difficult. This semiconductor substrate 101 for evaluation is for evaluating the defect detection sensitivity of an inspection device and comprises a plurality of first indentations 104 that are formed through the pressing, with a first pressing load, of an indenter having a prescribed hardness and shape into the semiconductor substrate for evaluation. Further, a mirror electron image of the plurality of first indentations of the (Continued)

semiconductor substrate for evaluation is acquired, and the defect detection sensitivity of an inspection device is evaluated through the calculation of the defect detection rate of the plurality of first indentations in the acquired mirror electron image.

15 Claims, 4 Drawing Sheets

(58) Field of Classification Search
CPC .... H01J 2237/24592; H01J 2237/2817; G06T 7/0004; G06T 2207/30148
See application file for complete search history.

(56) References Cited

U.S. PATENT DOCUMENTS

2016/0203946 A1* 7/2016 Hasegawa ............. H01J 37/265
250/310

2016/0218003 A1 7/2016 Hirooka et al.

FOREIGN PATENT DOCUMENTS

| JP | 2-61953 A | 3/1990 |
| JP | 9-147783 A | 6/1997 |
| JP | 2016-139685 A | 8/2016 |
| JP | 2016-183976 A | 10/2016 |
| WO | WO 2016/002003 A1 | 1/2016 |

OTHER PUBLICATIONS

Japanese-language Written Opinion (PCT/ISA/237) issued in PCT Application No. PCT/JP2017/039060 dated Jan. 16, 2018 (four (4) pages).

Yamaguchi et al., "Study on Deformation Characteristics, Constant Pressure Grinding and Mirror Finish Polishing Technology of SiC Single Crystal" The Japan Society for Precision Engineering, 2008, p. 447 with partial English-language translation (three (3) pages).

* cited by examiner

PLAN VIEW

CROSS-SECTIONAL VIEW

SEMICONDUCTOR SUBSTRATE FOR EVALUATION AND METHOD USING SAME TO EVALUATE DEFECT DETECTION SENSITIVITY OF INSPECTION DEVICE

TECHNICAL FIELD

The present invention relates to a semiconductor substrate for evaluation and a method using the same to evaluate defect detection sensitivity of an inspection device.

BACKGROUND ART

In manufacturing a semiconductor device, minute circuits are formed on a semiconductor wafer. In a wide gap semiconductor substrate, the fact of the matters is that more particles and flaws (scratches), or crystal defects and affected layers of a crystal are present compared to a silicon semiconductor substrate used in the past. For example, SiC (silicon carbide) whose usage as the power device material is expanding in recent years is excellent in chemical stability and hard, and is therefore a material that is harder in working and polishing into a wafer shape. Therefore, a SiC bulk wafer is subjected to mirror polishing by mechanical polishing and is thereafter subjected to CMP (Chemical Mechanical Polishing), a work-affected layer generated in the mechanical polishing is removed, and a surface flat in an atomic level and without crystal disturbance is formed. However, when an affected region and a scratch (called "latent scrach) which cannot be found by a general optical inspection technology may remain on the polished surface, on an epitaxial layer made to grow on the polished surface, abnormality occurs in the atomic step and a large morphological structure (called "step-bunching") is formed originated from them. When a device is formed on the epitaxial layer where the step-bunching is formed, voltage withstanding property deteriorates extremely, and the device cannot used as a power device. Therefore, it is vitally important to inspect a semiconductor substrate to find whether there remain latent scratches and a minute scratch.

As an inspection technology having sensitivity with respect also to latent scratches and a minute scratch on the wafer surface, there is disclosed in Patent Literature 1 an inspection technology to which a mirror electron microscope forming an image of the mirror electron is applied. According to Patent Literature 1, when an electric charge is generated inside the substrate by irradiating ultraviolet rays to the wafer, this electric charge is caught by and locally electrifies a work-affected region portion, and makes an equipotential surface on the surface to be distorted. In the mirror electron microscope, since even slight distortion of the equipotential surface causes shading in the mirror electron image, the worked affected region can be detected with high sensitivity. Also, since an electron beam is used for image forming, the resolution of the optical system is several tens nanometers which is extraordinarily high compared to an optical inspection technology.

CITATION LIST

Patent Literature

[Patent Literature 1] WO 2016/002003

Non-Patent Literature

[Non-patent Literature 1] Keishi Yamaguchi, Mutsumu Tohge, Junji Watanabe, Takayuki Nakano, and Shohei Hayasikawa "Deformation property, iso-pressure grinding, and polishing technology of SiC single crystal" The Japan Society for Precision Engineering, 2008 fall conference, p. 447 of collection of papers of sectional meeting

SUMMARY OF INVENTION

Technical Problem

The defect of the epitaxial layer formed on the semiconductor wafer or the wafer, detection of the defect being required by the inspection device to which a mirror electron microscope is applied, includes a defect accompanying the shape change such as surface morphology on the surface of such as a particle and a flaw (scratch) and a defect generated in the inside without surface shape change on the surface such as a crystal defect and an affected layer. The mirror electron microscope has an advantage of being capable of forming a crystal defect inside a wafer as an image even if there is no surface morphology on the wafer surface by allowing the crystal defect inside the wafer to trap electrons. However, in order to be used as an inspection device, it is required to assure that the defect detection sensitivity by the mirror electron image is constant at all times. For example, in a length measurement SEM that is similarly an inspection device, its performance is assured by measuring a test pattern that is formed by a photoresist or a metal thin film on the wafer.

Since the mirror electron microscope is an inspection device detecting a defect of a wafer, its detection sensitivity is to be determined based on a defect that can be recognized by a mirror electron image. However, since the defect is usually formed incidentally, both of its size and location are random, and it is hard to quantitatively evaluate the defect detection sensitivity of the device and to assure the performance.

Solution to Problem

A semiconductor substrate for evaluation for evaluating defect detection sensitivity of an inspection device detecting a defect of a semiconductor substrate by a mirror electron image which is an embodiment of the present invention includes a plurality of first indentations, and the first indentation is formed by pressing an indenter having prescribed hardness and shape into the semiconductor substrate for evaluation with a first pressing load.

Also, in a method for evaluating defect inspection sensitivity of an inspection device detecting a defect of a semiconductor substrate by a mirror electron image which is an embodiment of the present invention, a semiconductor substrate for evaluation, in which a plurality of first indentations formed by pressing an indenter having prescribed hardness and shape with a first pressing load are formed, is mounted on a wafer holder, magnitude of negative voltage applied to a wafer holder is adjusted so as to be capable of observing contrast of the first indentation in a mirror electron image, the mirror electron image is acquired with respect to the plural first indentations of the semiconductor substrate for evaluation, and a defect detection rate of the plural first indentations in the acquired mirror electron image is calculated.

Other problems and new features will be clarified from description and attached drawings of the present description.

Advantageous Effects of Invention

Defect inspection sensitivity can be evaluated quantitatively as a performance indicator of an inspection device using a mirror electron microscope.

DESCRIPTION OF EMBODIMENTS

Figure 1:
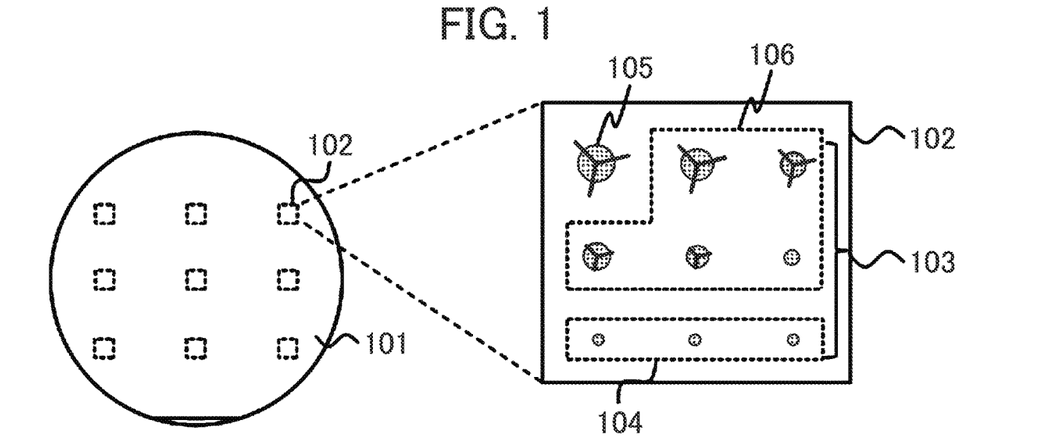
FIG. 1 is an explanatory drawing of a layout of a defect inspection sensitivity evaluation wafer of a mirror electron microscope.

An evaluation wafer 101 for evaluating defect inspection sensitivity of an inspection device using a mirror electron microscope is shown in FIG. 1. The evaluation wafer 101 is a semiconductor wafer of SiC, GaN, Si, $Ga_2O_3$, diamond, and the like, and is to be a semiconductor wafer of the same material as a semiconductor wafer on which a semiconductor device is formed, the semiconductor device inspecting a defect with a mirror electron microscope. The reason is that the material of the evaluation wafer is preferably the same material as a semiconductor wafer of an object of defect inspection since the contrast observed by the mirror electron microscope differs when the material of the semiconductor wafer is different.

In the evaluation wafer 101, cells 102 in which artificially formed defects 103 are arranged are scatteringly disposed. The defects 103 are made to be a reference of evaluation. The cells 102 are disposed at nine positions in an example of FIG. 1 so as to become as even as possible over the entire wafer so that the defect inspection sensitivity of the entire semiconductor wafer can be evaluated. Plural numbers of the defects 103 are formed in the cell 102, and disposal of the defects 103 in each of the cells 102 is made to have a same layout. Although the defect 103 is formed by pressing an indenter for forming an indentation to the evaluation wafer 101 as described below, defects with different defect state and defect size can be obtained by differentiating the pressing load of an indenter. In the cell 102, a plurality of defects that are formed to be differentiating the pressing load are disposed. In an example of FIG. 1, a defect 104 is a defect formed by the minimum pressing load in the cell 102, and plural numbers of defects formed with same minimum pressing load are formed in order to improve accuracy of defect inspection sensitivity evaluation. On the other hand, a defect 105 is a defect formed with a maximum pressing load in the cell 102, and it is preferable to have a magnitude of a degree capable of being detected by an optical microscope namely a size of several tens μm for example. Since observation in a mirror observation mode of a mirror electron microscope is narrow in the visual field and hard in positioning, in observation using a mirror electron microscope, it is general to execute positioning in an optical microscope mode using an optical system provided in the mirror electron microscope. The defect 105 is arranged for this positioning. Therefore, although the defects 105 may be arranged in each cell as an example of FIG. 1, the cell 105 only has to be arranged in at least one position of the evaluation wafer 101.

In addition, in the example of FIG. 1, a defect 106 is formed. The defect 106 is formed with a pressing load having magnitude between the defect 104 and the defect 105. The defect 104 is set so that the contrast in a mirror electron image of the defect 104 formed with the minimum pressing load in the evaluation wafer becomes the detection limit of the inspection device. Therefore, the defect 104 becomes a sensitivity indicator with respect to which degree of the defect size can be detected as the contrast in observation by the mirror electron microscope, and defect detection sensitivity evaluation of the mirror electron microscope is executed basically by the defect 104. On the other hand, the defect 106 is provided for evaluating the detection state of the defect 106 and analyzing a cause of deterioration of the defect detection sensitivity when sensitivity evaluation by the defect 104 is equal to or less than a specified value.

The number of piece, and the kind of disposal and the pressing load of the defect 103 in the cell 102 are not limited to those shown in the drawing. Further, a mark for positioning recognizable in the optical microscope mode may be put separately instead of the defect 105.

Figure 2:
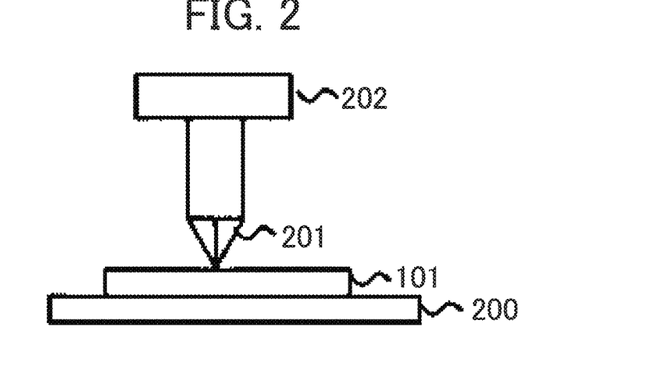
FIG. 2 is an explanatory drawing of a method for forming a defect in an evaluation wafer.

A method for forming a defect in the evaluation wafer 101 will be explained using FIG. 2. The evaluation wafer 101 is mounted on a stage 200 that is provided for moving to a specified coordinate on the wafer. A defect is formed by that a diamond indenter 201 with an acute angle is pressed to the evaluation wafer 101 mounted on the stage 200. A control unit 202 measures a load and deflection of the indenter in pressing the diamond indenter 201 to the wafer, and forms a defect with a specified pressing load at a specified position on the wafer. Also, when the wafer is of a compound semiconductor such as SiC, more crystal defects are included in general compared to a silicon wafer. Therefore, when the wafer is of a compound semiconductor, it is preferable to determine a position for disposing the cell after inspecting the crystal defect of the wafer 101 by a mirror electron microscope. Further, although the wafer may be either a bulk wafer or a wafer where an epitaxial layer is formed on a bulk wafer, it is preferable to use a bulk wafer with less defect as a usage for the evaluation wafer.

Since the defect of the evaluation wafer 101 is for evaluating the defect detection sensitivity of the inspection device, it is required to precisely form minute defects with equal defect state and defect size. Desired minute defects can be formed with high reproducibility by using a same indenter or, in concrete terms, using an indenter having prescribed hardness and shape, and forming the defect using a pressing load as a parameter. With respect to setting of the pressing load for forming a defect, it is preferable to form plural numbers of defects and to be determined based on the defect state and the defect size, however a load described in Non-patent Literature 1 may be used as a reference. An indentation is formed in the wafer 101 to which the indenter has been pressed, and the indentation differs according to the pressing load. It has been clarified by TEM observation and analysis of an AFM and the like that the crystal defect becomes larger in proportion to the pressing load of the indenter 201.

Figure 3A:
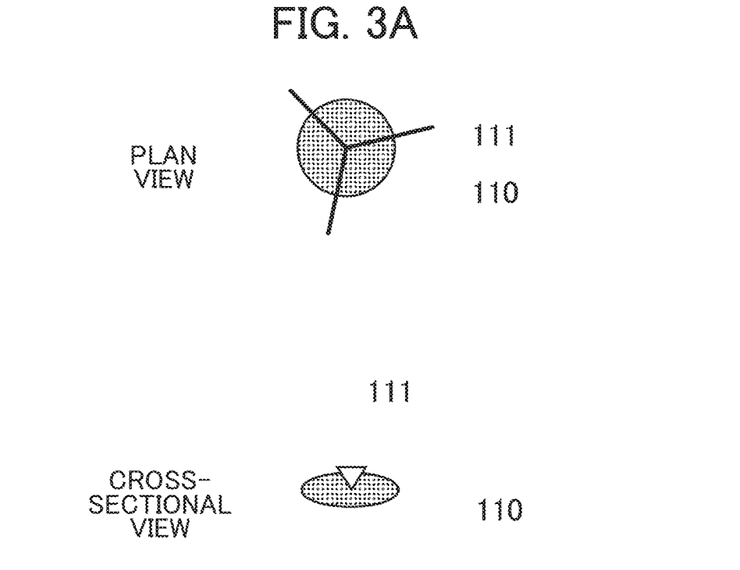
FIG. 3A is a schematic drawing of a defect formed in the evaluation wafer.

FIG. 3A schematically shows a defect formed when an indentation is formed with a comparatively large pressing load in the wafer 101 (the defect 105 in FIG. 1 for example).

Figure 3B:
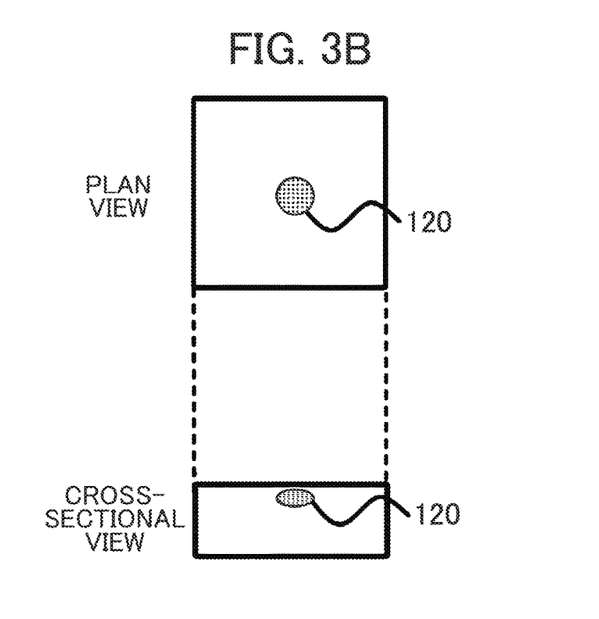
FIG. 3B is a schematic drawing of a defect formed in the evaluation wafer.

In this case, a surface morphology (called as "surface defect") 111 appearing on the wafer surface and a crystal defect 110 inside the wafer are formed. On the other hand, FIG. 3B schematically shows a defect formed when an indentation is formed with a comparatively small pressing load in the wafer 101 (the defect 104 in FIG. 1 for example). In this case, although the surface defect is not formed and only a crystal defect 120 is generated, the crystal defect 120 also becomes smaller than the crystal defect 110 of FIG. 3A since the pressing load is smaller. Since the surface defect is not formed, the indentation of FIG. 3B cannot be detected by such observation system as a scanning electron microscope for example.

When one sheet of the evaluation wafer for evaluating the defect detection sensitivity is required with respect to one set of the mirror electron microscope, indentation wafers of the number of piece of the devices are required. Since a cost is incurred when the evaluation wafer is manufactured by pressing the indenter as explained by FIG. 2, a wafer with pattern that uses one sheet of indentation wafer (a wafer manufactured by a method explained by FIG. 2 is called "indentation wafer") as a reference may be substituted. The wafer with pattern substituting the indentation wafer will be explained using FIG. 4.

Figure 4:
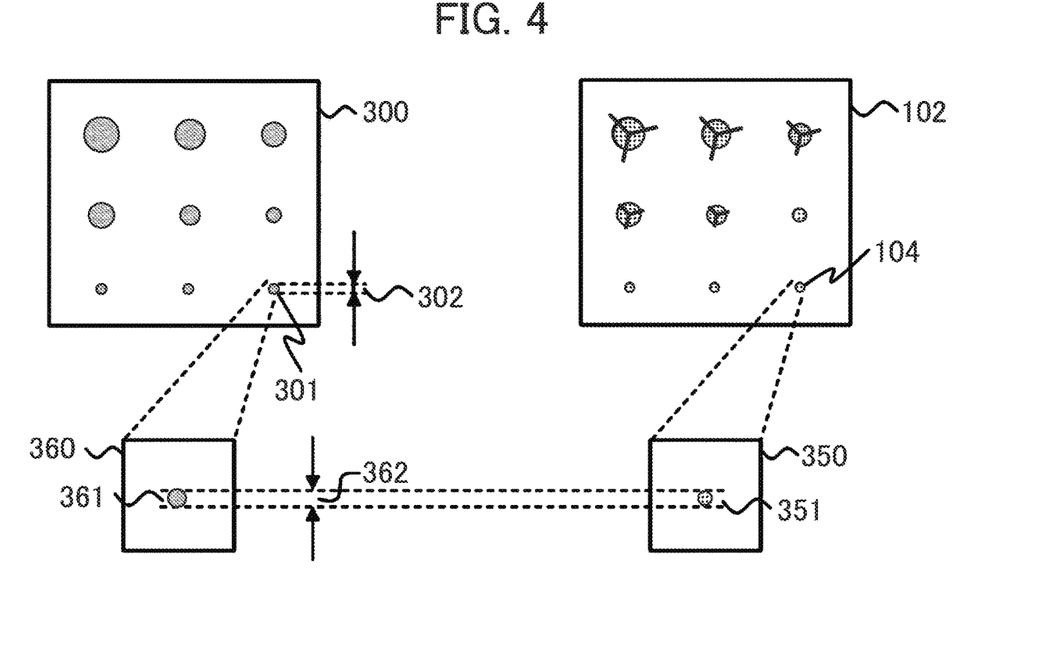
FIG. 4 is an explanatory drawing of a wafer with evaluation pattern.

The principle of the inspection device using a mirror electron microscope is as follows. First, an ultraviolet ray is irradiated to a semiconductor wafer, and a carrier is generated at a crystal defect position of the semiconductor material. The mirror electron microscope forms generally uniform and flat equipotential line right above the semiconductor wafer, and detects distortion of the equipotential line caused by local charging that is caused by generation of this carrier. One generating the distortion of the equipotential line is not limited to local charging, and morphology of the semiconductor wafer can also generate the distortion of the equipotential line in a similar manner. The wafer with pattern utilizes this detection principle of the mirror electron microscope.

In FIG. 4, a cell 300 of a wafer with pattern corresponding to the cell 102 of an indentation wafer is shown. In the wafer with pattern, patterns with different sizes are formed corresponding to the defect of the indentation wafer. The pattern only has to be formed using a general semiconductor process, and can be obtained for example by vaporizing aluminum on the semiconductor wafer surface, and etching an aluminum layer. Also, the metal may be other than aluminum. Further, it is preferable that the material of the wafer with pattern is the same material as the indentation wafer in order to secure similar contrast in observation by a mirror electron microscope, and that the shape of the pattern is made to be a shape similar to the contrast of the time when the defect of the indentation wafer is observed by the mirror electron microscope.

A minimum width pattern 301 of the wafer with pattern is observed by the mirror electron microscope, and a mirror electron image 360 of the minimum width pattern is acquired. On the other hand, the defect 104 formed with the minimum pressing load of the indentation wafer is observed by the mirror electron microscope in a similar manner, and a mirror electron image 350 is acquired. The mirror electron image 350 can be deemed to be an image of the detection limit of the defect in the inspection device, and a width 302 of the minimum width pattern is set so that a contrast 351 of a mirror electron image of the detection limit and a contrast 361 of a mirror electron image of the wafer with pattern become a same size 362. Thus, since the contrast of the mirror electron image of the minimum width pattern and the contrast of the detection limit of the indentation wafer become a same size, the detection sensitivity can be evaluated equivalently.

By forming a corresponding pattern with respect also to a defect of the indentation wafer formed with a larger pressing load (the defect 106 of FIG. 1) in a similar manner, the defect detection sensitivity can be evaluated similarly to the indentation wafer using the wafer with pattern.

An inspection device using a mirror electron microscope will be explained using FIG. 5. However, in FIG. 5, a vacuum exhaust pump and its control device, exhaust system piping, a transportation system of wafer to be inspected, an optical system for observation in an optical microscope mode described above, and so on are omitted. Also, an orbit of the electron ray is exaggeratedly drawn compared to an actual orbit for the sake of explanation.

First, an electron optical system will be explained. An irradiation electron beam 400a emitted from an electron gun 401 is deflected by a separator 403 while being converged by a condenser lens 402, and is irradiated so as to be an electron beam with a generally parallel flux to a wafer 404 to be an inspection object. Although a Zr/O/W type shot key electron source having a small light source diameter and capable of securing a large electric current value is used for the electron gun 401, an electron source such as a $La/B_6$ electron source securing a higher electric current value and a cold cathode electron source having higher brightness may be used. Also, the electron gun 401 may be a magnetic field superposition type electron gun in which a magnetic field lens is disposed in the vicinity of the electron source. The voltage and electric current required for operation of an electron gun such as the extraction voltage of the electron gun 401, the accelerating voltage of the extracted electron beam, and a heating electric current of the electron source filament are supplied and controlled by an electron gun control device 405. When a shot key electron source and a cold cathode electron source are used for the electron gun 401, the inside of the electron gun 401 should be maintained to ultra-high vacuum such as $10^{-6}$ Pa or below, and therefore there is provided a cutoff valve that is for maintaining vacuum at the time of maintenance and the like.

Figure 5:
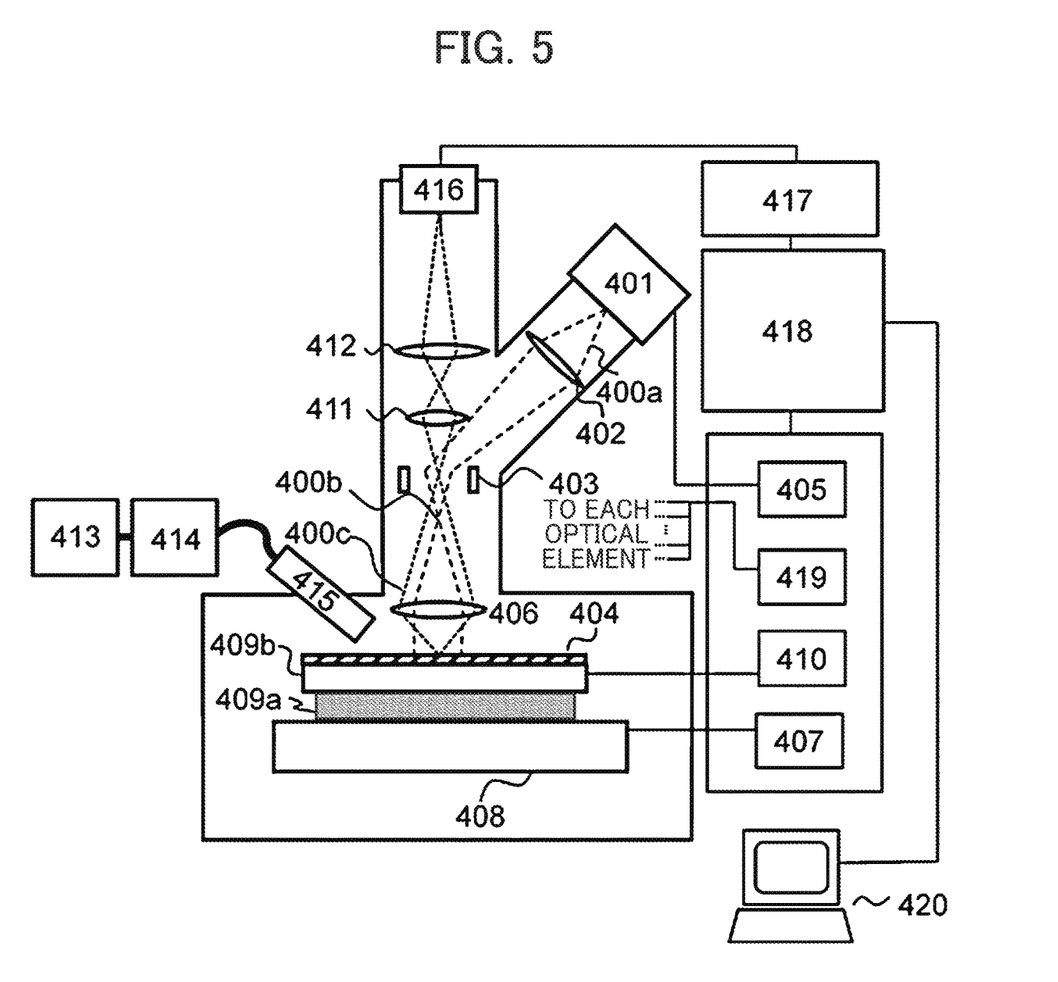
FIG. 5 is a block diagram of an inspection device using a mirror electron microscope.

Although the condenser lens 402 is illustrated as one lens in FIG. 5, the condenser lens 402 may be an electron optical system combining plural numbers of lenses and multipoles in order to obtain an irradiation electron beam with higher parallelism. The condenser lens 402 is adjusted so that the electron beam converges on a rear focal plane 400b of an object lens 406. The object lens 406 is either an electrostatic lens including plural numbers of electrodes or a magnetic field lens.

The separator 403 is installed in order to separate an irradiation electron beam heading to the wafer to be inspected 404 and a mirror electron beam returning from the wafer to be inspected 404 from each other. For example, a separator utilizing an E×B deflector can be used. The E×B deflector can be set so as to allow the electron beam coming from above to be deflected and to allow the electron beam coming from underneath to go straight. In this case, an electron optical lens barrel (irradiation electron beam lens barrel) supplying the irradiation electron beam 400a is made to incline, and an electron optical lens barrel (electron beam focusing lens barrel) focusing the reflected electrons stands upright. As the separator, it is also possible to use a deflector using the magnetic field only. In concrete terms, the magnetic field is arranged in a direction orthogonal to the optical axis of the electron beam, the irradiation electron beam 400a is deflected to the direction of the wafer to be inspected 404, and the electrons from the wafer to be inspected 404 are deflected to the direction of direct opposition of the direction along which the irradiation electron beam 400a comes. In this case, the optical axis of the irradiation electron lens barrel and the optical axis of the electron beam focusing lens barrel are disposed to be bilaterally symmetrical with each other around the optical axis of the object lens. When it is required to correct aberration generated when the irradiation electron beam 400a is deflected by the separator, an aberration corrector may be installed additionally. Also, when the separator 403 is a magnetic field deflector, an auxiliary coil is arranged for correction.

The irradiation electron beam 400a deflected by the separator 403 is formed into an electron beam of a parallel flux incident orthogonally to the surface of the wafer to be inspected 404 by the object lens 406. Since the irradiation system condenser lens 402 is adjusted so that the electron beam is converged to the rear focal point 400b of the object lens 406 as described above, an electron beam with high parallelism can be irradiated to the wafer to be inspected 404. A region on the wafer to be inspected 404 to which the irradiation electron beam 400a is irradiated has such area of 10,000 $\mu m^2$ and the like for example. The object lens 406 includes an anode for lifting the mirror electrons upward of the surface of the wafer to be inspected 404.

On a motion stage 408 controlled by a motion stage control device 407, a wafer holder 409b is installed through an insulation member 409a, and the wafer to be inspected 404 is mounted on the wafer holder 409b. The drive method of the motion stage 408 is two linear movements orthogonal to each other. In addition, linear movement in the vertical direction and movement in an inclined direction may be added. The motion stage 408 allows the entire surface or a part on the surface of the wafer to be inspected 404 to be positioned on an electron beam irradiation position, namely, on the optical axis of the object lens 406 by these movements.

In order to form negative potential on the surface of the wafer to be inspected 404, negative potential which is generally the same as the accelerating voltage of the electron beam is supplied to the wafer holder 409b by a high-voltage power supply 410. Output of the high-voltage power supply 410 is finely adjusted so that the irradiation electron beam 400a is decelerated before the wafer to be inspected 404 by this negative potential and the electron orbit reverses to the opposite direction before colliding on the wafer to be inspected 404. The electrons reflected by the wafer becomes mirror electrons 400c.

The mirror electrons 400c form a first image by the object lens 406. Since the separator 403 is the E×B deflector, it is possible to be controlled so as not to have a deflecting action with respect to the electron beam coming from beneath, the mirror electrons 400c moves linearly to the direction of the electron beam focusing lens barrel that stands upright, and the first image is focused sequentially by an intermediate electron lens 411 and a projection electron lens 412. These intermediate lens 411 and projection lens 412 are either an electrostatic lens or a magnetic field lens. A final electron image is enlargedly projected to an image detection unit 416. Although the projection electron lens 412 is illustrated as one electron lens in FIG. 5, there is also a case of being configured of plural numbers of electron lenses and a multipole for enlargement by high magnifications, correction of image distortion, and so on. Although it is not illustrated in the present drawing, a deflector, a non-point corrector, and the like for adjustment of the electron beam more in detail are furnished as necessary.

An ultraviolet ray from an ultraviolet ray light source 413 is dispersed by a spectrometer 414, and is irradiated to the wafer to be inspected 404 by an ultraviolet ray optical element 415. Since the wafer to be inspected 404 is maintained in a vacuum, the atmospheric side and the vacuum side are separated from each other by a window manufactured by a material allowing the ultraviolet ray to transmit (quarts and the like for example), and the ultraviolet ray emitted from the ultraviolet ray optical element 415 is irradiated through the window. Alternatively, although the ultraviolet ray light source 413 may be disposed within the vacuum, in this case, since a space inside a sample chamber is limited, it is preferable to use a solid element and the like having a specific light emission wavelength as an ultraviolet ray light source instead of wavelength selection by the spectrometer 414. The ultraviolet ray irradiated to the wafer to be inspected 404 is to have a wavelength larger than the band gap of the wafer material and corresponding to energy of a range not generating a photoelectron (refer to Patent Literature 1). However, according to the situation of the energy level within the band gap of the material, there is a case of selecting a wavelength of less energy than the hand gap energy as a wavelength generating carriers within the semiconductor material. The ultraviolet ray light source 413, the spectrometer 414, and the ultraviolet ray optical element 415 are connected to each other by an optical fiber and the like, and the ultraviolet ray is transferred among them. Alternatively, the ultraviolet ray light source 413 and the spectrometer 414 may be of an integrated configuration. Also, a filter allowing only a wavelength of a specific range to transmit may be used as the ultraviolet ray light source 413 instead of the spectrometer 414.

The image detection unit 416 converts an image of the mirror electrons 400c into an electric signal, and transfers the same to a defect determination unit 417. The image detection unit 416 may be configured of a fluorescent plate converting the electron beam into a visible light and a camera photographing an electron image in the fluorescent plate, and may be configured of a two-dimensional detector such as a CCD element detecting electrons as another configuration example. A mechanism multiplying the strength of the electron image and the strength of the fluorescent light may be also provided.

Mirror electron images at respective positions on the surface of the wafer to be inspected 404 are outputted from the image detection unit 416 while the motion stage 408 is driven. There is a case that the motion stage 408 stops at each time of photographing or a case that the motion stage 408 does not stop and continues to move keeping a constant speed. The latter has an advantage of being capable of shortening the time for inspection. In this case, the image detection unit 416 executes photographing of a time delay integration (TDI) type. Since the moving speed of the motion stage 408 and the signal transfer rate (line rate) of the image element are synchronized and the time incurred for acceleration and deceleration of the motion stage 408 is not required, a high speed inspection motion is enabled.

The operating condition of each portion of various devices such as a condition of the TDI photographing operation is inputted to and outputted from an inspection device control unit 418. To the inspection device control unit 418, various conditions such as the accelerating voltage at the time of generation of the electron beam, the stage moving speed, the image signal acquisition timing from the image detection element, the ultraviolet ray irradiation condition, and so on are inputted beforehand by the user through an input/output device with monitor 420, and the motion stage control device 407, an electron optical system control device 419 controlling each electron optical element, a control system of the ultraviolet ray light source 413 and the spectrometer 414, and so on are totally controlled. There is also a case that the inspection device control unit 418 is configured of plural numbers of computers that share roles and are joined to each other by lines of communication.

Figure 6:
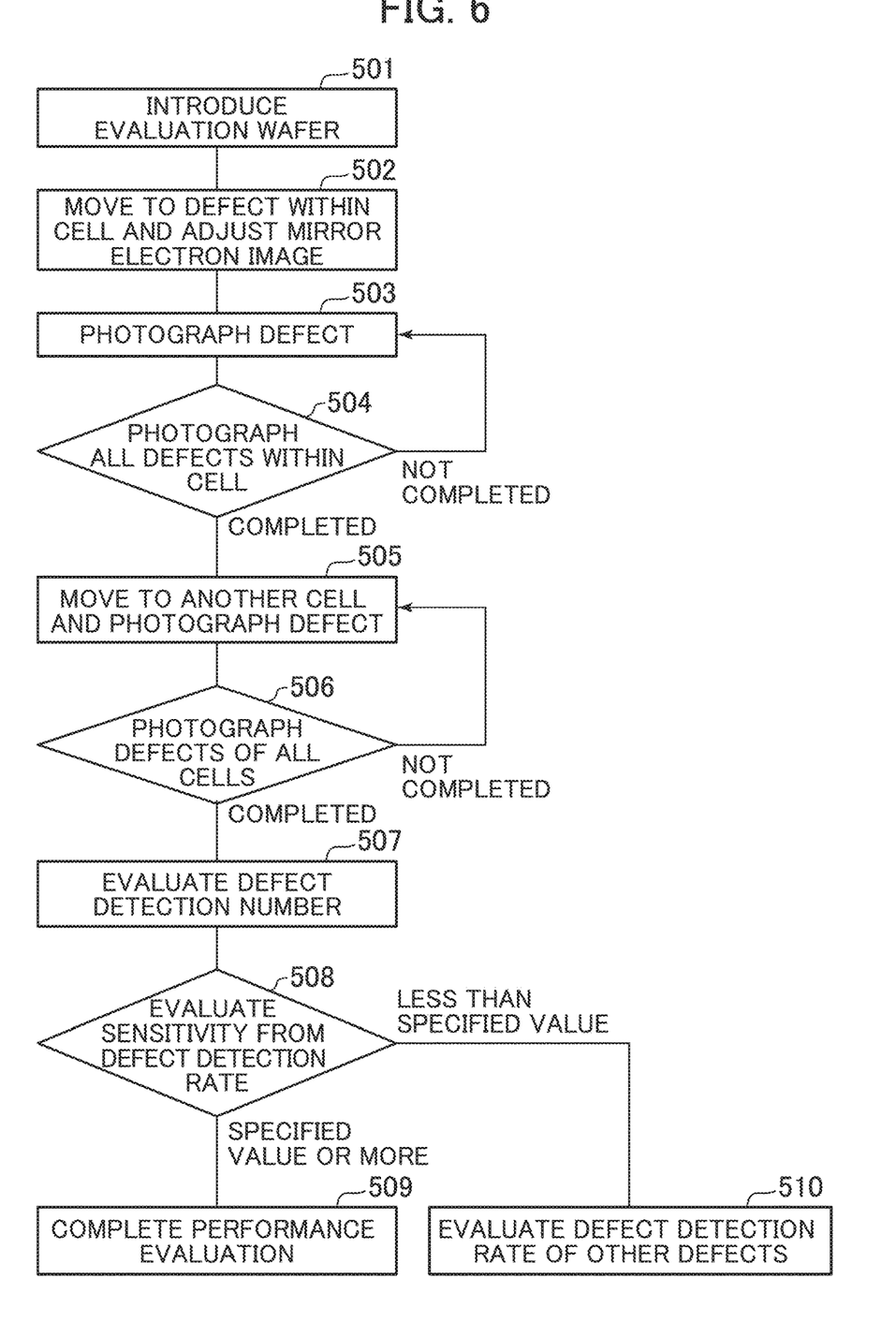
FIG. 6 is a flowchart of performance evaluation of an inspection device.

A performance evaluation flow of an inspection device using an evaluation wafer explained in FIG. 1 will be explained using FIG. 6. Further, a case of using an evaluation wafer explained in FIG. 4 is also similar. In this case, "defect" can read "pattern", "defect detection rate" can read "pattern detection rate", and irradiation of the ultraviolet ray is not required also.

First, the evaluation wafer for evaluating the defect inspection sensitivity is introduced to the wafer holder 409*b* of the inspection device (mirror electron microscope) (step 501). First, a large indentation (the defect 105 of FIG. 1) or a mark which are located on the evaluation wafer and can be observed by the optical microscope are detected in the optical microscope mode, and the mode is switched to the mirror electron mode. The inspection device stores the relative positional coordinate of the defect in the cell 102, and the inspection device control unit 418 moves the evaluation wafer so that at least one of the defects 104 comes into the field of view by controlling the motion stage control device 407 based on the relative positional coordinate having been stored. An ultraviolet ray is irradiated to the evaluation wafer from the ultraviolet ray optical element 415, an electron beam is irradiated from the electron gun 401, and the voltage applied to the wafer holder 409*b* by the high-voltage power supply 410 is adjusted so that the contrast of the mirror electron image of the defect 104 can be secured (step 502). An image of the defect is acquired in a state of being adjusted so that an image that becomes the limit of detection sensitivity of the mirror electron microscope in the defect layout shown in FIG. 1 is acquired (step 503). The motion stage 408 is moved, and images of all defects within the cell 102 are acquired (step 504). When photographing of an image of defects within one cell 102 is completed, the motion stage 408 is moved to another cell, and acquires an image of defects in a similar manner (step 505). When photographing of defects of all cells is completed (step 506), the images having been photographed are sent to the defect determination unit 417, and the defect detection number is counted (step 507).

As an example, when the minimum indentations 104 adjusted so as to secure an image becoming the limit of the detection sensitivity of the mirror electron microscope are disposed by three pieces within a same cell and nine pieces of the cell are disposed within the evaluation wafer as the defect layout shown in FIG. 1, the crystal defects formed by the minimum load become 27 pieces per one evaluation wafer. In this regard, when the number of detections in the coordinate where the defects 104 in the mirror electron image are formed is 27 pieces, the defect detection rate becomes 27/27=100%, and it can be determined to be the maximum detection sensitivity (step 508). When the defect detection rate is equal to or greater than a specified value, performance evaluation is completed (step 509). When the detection rate of the crystal defect formed by the minimum load is less than the specified value, the defect detection rate of the defect 106 formed by a load greater than the minimum load is calculated which can be used for study of the cause the defect detection sensitivity does not reach the specified value.

Further, although the flow for photographing all the defects within the cell 102 is shown here, it is also possible to photograph only the minimum indentation 104 to evaluate the sensitivity from the defect detection rate, and to photograph a defect formed with a larger pressing load to evaluate the defect detection rate only when the sensitivity is less than a specified value.

LIST OF REFERENCE SIGNS

101 . . . evaluation wafer, 102 . . . cell, 103, 104, 105, 106 . . . defect, 200 . . . stage, 201 . . . indentation forming indenter, 202 . . . control unit, 400*a* . . . irradiation electron ray, 400*b* . . . rear focal plane, 400*c* . . . mirror electron, 401 . . . electron gun, 402 . . . condenser lens, 403 . . . separator, 404 . . . wafer to be inspected, 405 . . . electron gun control device, 406 . . . object lens, 407 . . . motion stage control device, 408 . . . motion stage, 409*a* . . . insulation member, 409*b* . . . wafer holder, 410 . . . high-voltage power supply, 411 . . . intermediate electron lens, 412 . . . projection electron lens, 413 . . . ultraviolet ray light source, 414 . . . spectrometer, 415 . . . ultraviolet ray optical element, 416 . . . image detection unit, 417 . . . defect determination unit, 418 . . . inspection device control unit, 419 . . . electron optical system control device, 420 . . . input/output device with monitor

The invention claimed is:

1. A semiconductor substrate for evaluation for evaluating defect detection sensitivity of an inspection device that detects a defect of a semiconductor substrate by a mirror electron image, the semiconductor substrate for evaluation comprising:
   a of first indentation,
   wherein the first indentation is an indentation, in which a crystal defect is generated inside the semiconductor substrate for evaluation without forming surface morphology appearing on the surface of the semiconductor substrate for evaluation, formed by pressing an indenter having prescribed hardness and shape into the semiconductor substrate for evaluation with a first pressing load.

2. The semiconductor substrate for evaluation according to claim 1,
   wherein the first pressing load is set so that contrast in the mirror electron image of the first indentation becomes a detection limit of the inspection device.

3. The semiconductor substrate for evaluation according to claim 1, further comprising:
   a third indentation or a mark in the semiconductor substrate for evaluation, the third indentation or the mark being capable of being observed in an optical microscope mode of the inspection device,
   wherein the third indentation is an indentation in which a crystal defect is generated inside the semiconductor substrate for evaluation and forming surface morphology appearing on the surface of the semiconductor substrate for evaluation.

4. The semiconductor substrate for evaluation according to claim 1,
   wherein a material of the semiconductor substrate for evaluation is the same material as the semiconductor substrate, and is any one of SiC, GaN, Si, $Ga_2O_3$, or diamond.

5. The semiconductor substrate for evaluation according to claim 4,
   wherein the semiconductor substrate for evaluation is a bulk wafer.

6. A semiconductor substrate for evaluation for evaluating defect detection sensitivity of an inspection device that detects a defect of a semiconductor substrate by a mirror electron image, the semiconductor substrate for evaluation comprising:
  a plurality of first patterns arranged on a surface of the semiconductor substrate for evaluation,
  wherein a width of the first pattern is set so that a magnitude of contrast in the mirror electron image of the first pattern is the same magnitude of contrast in the mirror electron image of a first indentation that is formed in a wafer having the same material as the semiconductor substrate for evaluation,
  wherein the first indentation is an indentation formed by pressing an indenter having prescribed hardness and shape into the wafer with a first pressing load, and
  wherein the first pressing load is set so that contrast in the mirror electron image of the first indentation becomes a detection limit of the inspection device.

7. The semiconductor substrate for evaluation according to claim 6, further comprising:
  a plurality of second patterns arranged on a surface of the semiconductor substrate for evaluation,
  wherein a width of the second pattern is set so that a magnitude of contrast in the mirror electron image of the second pattern becomes the same magnitude of contrast in the mirror electron image of a second indentation that is formed in the wafer, and
  wherein the second indentation is an indentation formed by pressing the indenter into the wafer with a second pressing load that is larger than the first pressing load.

8. The semiconductor substrate for evaluation according to claim 6,
  wherein a material of the semiconductor substrate for evaluation is the same material as the semiconductor substrate, and is any one of SiC, GaN, Si, $Ga_2O_3$, or diamond.

9. The semiconductor substrate for evaluation according to claim 8,
  wherein the first pattern is a metal film formed on the semiconductor substrate for evaluation.

10. A method for evaluating defect inspection sensitivity of an inspection device that detects a defect of a semiconductor substrate by a mirror electron image, the method comprising the steps of:
  mounting, on a wafer holder, a semiconductor substrate for evaluation in which a plurality of first indentations, in each of which a crystal defect is generated inside the semiconductor substrate for evaluation without forming surface morphology appearing on the surface of the semiconductor substrate for evaluation, are formed, the plurality of first indentations being formed by pressing an indenter having prescribed hardness and shape with a first pressing load;
  adjusting magnitude of negative voltage applied to the wafer holder so as to be capable of observing contrast of the first indentation in the mirror electron image;
  acquiring the mirror electron image with respect to the plural first indentations of the semiconductor substrate for evaluation; and
  calculating a defect detection rate of the plural first indentations in the mirror electron image having been acquired.

11. The method for evaluating defect inspection sensitivity according to claim 10,
  wherein the first pressing load is set so that contrast in the mirror electron image of each of the plurality of first indentations becomes a detection limit of the inspection device.

12. The method for evaluating defect inspection sensitivity according to claim 11,
  wherein a plurality of second indentations are formed in the semiconductor substrate for evaluation,
  wherein the mirror electron image is acquired with respect to the plural second indentations of the semiconductor substrate for evaluation, and
  wherein when a defect detection rate of the plurality of first indentations is less than specified value, a defect detection rate of the plurality of second indentations in the mirror electron image having been acquired is calculated.

13. A method for evaluating defect inspection sensitivity of an inspection device that detects a defect of a semiconductor substrate by a mirror electron image, the method comprising the steps of:
  mounting, on a wafer holder, a semiconductor substrate for evaluation in which a plurality of first patterns are formed;
  adjusting magnitude of negative voltage applied to the wafer holder so that contrast of the first patterns can be observed in the mirror electron image;
  acquiring the mirror electron image with respect to the plural first patterns on the semiconductor substrate for evaluation; and
  calculating a detection rate of the plural first patterns in the mirror electron image having been acquired,
  wherein a width of the first pattern is set so that a magnitude of contrast in the mirror electron image of the first patterns becomes the same magnitude of contrast in the mirror electron image of a first indentation formed in a wafer having the same material as the semiconductor substrate for evaluation,
  wherein the first indentation is an indentation formed by pressing an indenter having prescribed hardness and shape into the wafer with a first pressing load, and
  wherein the first pressing load is set so that contrast in the mirror electron image of the first indentation becomes a detection limit of the inspection device.

14. The method for evaluating defect inspection sensitivity according to claim 13,
  wherein a plurality of second patterns are formed on a surface of the semiconductor substrate for evaluation,
  wherein the mirror electron image is acquired with respect to the plural second patterns on the semiconductor substrate for evaluation, and
  wherein when a detection rate of the plural first patterns is less than a specified value, a detection rate of the plural second patterns in the mirror electron image having been acquired is calculated.

15. The semiconductor substrate for evaluation according to claim 3, further comprising:
  a plurality of second indentations arranged in the semiconductor substrate for evaluation,
  wherein the third indentation is an indentation formed by pressing the indenter into the semiconductor substrate for evaluation with a third pressing load that is larger than the first pressing load,
  wherein the second indentations are indentations formed by pressing the indenter into the semiconductor substrate for evaluation with a second pressing load that is larger than the first pressing load and smaller than the third pressing load.

\* \* \* \* \*